(12) United States Patent
Lendlein

(10) Patent No.: US 8,148,449 B2
(45) Date of Patent: Apr. 3, 2012

(54) SHAPE MEMORY COMPOSITES

(75) Inventor: Andreas Lendlein, Berlin (DE)

(73) Assignee: Helmholtz-Zentrum Geesthacht Zentrum fur Material—und Kustenforschung GmbH, Geesthacht (DE)

( * ) Notice: Subject to any disclaimer, the term of this patent is extended or adjusted under 35 U.S.C. 154(b) by 443 days.

(21) Appl. No.: 12/282,088

(22) PCT Filed: Mar. 23, 2007

(86) PCT No.: PCT/EP2007/002594
§ 371 (c)(1),
(2), (4) Date: Nov. 20, 2008

(87) PCT Pub. No.: WO2007/107377
PCT Pub. Date: Sep. 27, 2007

(65) Prior Publication Data
US 2009/0131604 A1    May 21, 2009

(30) Foreign Application Priority Data

Mar. 23, 2006 (EP) .................................. 06006054

(51) Int. Cl.
| | |
|---|---|
| *B32B 9/00* | (2006.01) |
| *B32B 9/04* | (2006.01) |
| *B32B 19/00* | (2006.01) |
| *B32B 27/00* | (2006.01) |
| *B32B 27/04* | (2006.01) |
| *B60C 1/00* | (2006.01) |
| *C08G 18/28* | (2006.01) |
| *C08G 59/42* | (2006.01) |
| *C08J 3/00* | (2006.01) |
| *C08K 3/00* | (2006.01) |
| *C08K 3/04* | (2006.01) |
| *C08K 3/34* | (2006.01) |
| *C08K 3/40* | (2006.01) |
| *C08K 9/00* | (2006.01) |
| *C08K 9/06* | (2006.01) |
| *C08L 75/00* | (2006.01) |

(52) U.S. Cl. .................. 523/200; 428/411.1; 428/425.9; 428/688; 523/205; 523/213; 523/214; 523/324; 524/401; 524/492; 524/493; 524/494; 524/495; 524/496; 524/590

(58) Field of Classification Search .................. 523/200, 523/205, 213, 214, 324; 524/401, 492, 493, 524/494, 495, 496, 590; 428/411.1, 425.9, 428/688
See application file for complete search history.

(56) References Cited

U.S. PATENT DOCUMENTS
2003/0055198 A1    3/2003 Langer et al.

FOREIGN PATENT DOCUMENTS
| | | |
|---|---|---|
| JP | 09-291131 | 11/1997 |
| WO | 2004/062706 A1 | 7/2004 |
| WO | 2005/056642 A1 | 6/2005 |

OTHER PUBLICATIONS

Gall et al., K, "Shape Memory Polymer Nanocomposites," Acta Materialiar, 50: 5115-5125, XP002438766 (2002).
Lendlein et al., A., "Shape-Memory Polymers," Angewandte Chemie Int. Ed., 41: 2034-2057, XP002438767 (2002).
Xu et al., J. "Synthesis and Shape Memory Effects of Si-O-Si Cross-Linked Hybrid Polyurethanes," Polymer, 47: 457-465, XP002385296 (2005).

*Primary Examiner* — Patrick Niland
(74) *Attorney, Agent, or Firm* — Hogan Lovells US LLP

(57) ABSTRACT

The present invention concerns shape memory composites, methods of preparing same and the use of these composites, for example, for products prepared by injection molding techniques or coating applications.

10 Claims, 4 Drawing Sheets

SHAPE MEMORY COMPOSITES

CROSS REFERENCE TO RELATED APPLICATIONS

This application claims priority under 35 U.S.C. §371 to International Application No. PCT/EP2007/002594 (filed Mar. 23, 2007) which claims priority to European Application No. 06006054.8 (filed Mar. 23, 2006), each of which application is expressly incorporated herein by reference in their entirety.

The present invention concerns shape memory composites, methods of preparing same and the use of these composites, for example, for products by injection molding techniques, extrusion, solution techniques or coating applications.

BACKGROUND

The shape memory effect or shape memory functionality is a phenomenon already known and established for metal alloys as well as polymers. Shape memory functionality is the ability of a material to temporarily fix a second shape after an elastic deformation and only recover the original (first) shape after application of an external stimulus. The advantageous and intriguing properties of shape memory materials are in particular the possibility to initiate a desired change in shape by an appropriate external stimulus, so that an original shape, after deformation, is re-established, and the possibility to deform and program these materials so that highly specific configurations and shape changes can be obtained. The deformed shape is often called the temporary shape in the art. The phenomenon is a functionality and not an inherent material property. The effect/functionality results from a combination of material structure and specific functionalization processes.

As already indicated above, the first materials known to provide this functionality were metallic shape memory alloys. In the recent past, shape memory polymers have been developed. Typical shape memory polymers are, for example, phase segregated linear block copolymers, having a hard segment and a switching (soft) segment, typically thermoplastic materials. Other examples are systems comprising soft segments (switching segments) and chemical, e.g. covalent network points/crosslinks, which provide the function of the hard segments, typically in network materials. Important representatives of these types of materials are disclosed in the international publications WO 99/42147 and WO 99/42528. These materials employ as external stimulus for initiating the recovery of the original shape a change in temperature, usually a temperature rise. Shape memory polymers being susceptible to other external stimuli are also known, such as the photosensitive shape memory polymers disclosed in WO 2004/062706.

The shape memory effect or function, as seen with shape memory polymer as identified above, may be explained on the molecular level as follows.

The hard segments or the above described chemical network points are responsible for the original (first) shape by providing stable crosslinks, which may be chemical (covalent) or physical (ionic, coordinative, other physical interactions). These crosslinks provide strong interactions within the material, so that these crosslinks establish the permanent (i.e. original) shape. The switching (soft) segments likewise provide crosslinks, at least to a certain extent, crosslinks which may, however, be loosened or destroyed upon application of a suitable external stimulus. These crosslinks again may be of physical or chemical (e.g. covalent) nature. Soft segments in this respect define segments which are responsible for fixing the temporary shape, i.e. switching segments. A shape memory polymer, in the form as established by the hard segments or the chemical network points, may be deformed by appropriate processes, for example, by heating to a temperature above the transition temperature (for temperature-dependent shape memory polymers) of the switching segments. In the deformed state, the shape memory polymer is then fixed and cooled, so that crosslinks are established between the switching (soft) segments, holding the shape memory polymer in the deformed, i.e. temporary, shape. After application of a suitable external stimulus, in this example a new rise in temperature to above the transition temperature of the switching segments, the crosslinks within the switching segments fixing the temperature shape are loosened (destroyed), so that the material recovers the original, i.e. permanent, shape defined by the hard segments.

Various shape memory polymers which provide the above described shape memory functionality have been developed in recent years. However, such shape memory polymers are not applicable in all technical fields, either due to mechanical restrictions or cost considerations. Accordingly, there exists the need to develop novel materials which enable the provision of shape memory functionality which either show better mechanical properties, such as hardness, stiffness etc., compared with conventional shape memory polymer and/or which can be prepared at lower costs, compared with the conventional shape memory polymers.

BRIEF DESCRIPTION OF THE INVENTION

The present invention solves the above object with the shape memory composites as defined in claim 1. Preferred embodiments are outlined in claims 2 to 7. Furthermore, the present invention provides methods for preparing such shape memory composites as defined in claims 8 and 9 as well as the use as defined in claim 10. In particular the present invention concerns shape memory composites, methods of preparing same and the use of these composites, for example, for products prepared by injection moulding techniques or coating applications.

BRIEF DESCRIPTION OF THE FIGURES

FIG. 1: PARTICLE WITH OH-GROUPS AND POLYMERIC PRECURSORS WITH NCO-TERMINAL GROUPS PROVIDE A NETWORK STRUCTURE OF HARD PHASES (PARTICLES) AND SWITCHING PHASES (POLYMER CHAINS)

FIG. 2: SANDWICH STRUCTURE OBTAINED BY REACTING OH-FUNCTIONALIZED SHEET LIKE HARD PHASES WITH POLYMERIC PRECURSORS FOR SWITCHING SEGMENTS, AGAIN WITH NCO-TERMINAL GROUPS

FIG. 3: OH-FUNCTIONALIZED HARD PHASES (PARTICLES) ARE BOUND TO OH-FUNCTIONALIZED

POLYMERIC PRECURSORS OF SWITCHING SEGMENTS USING DIACIDCHLORIDE REACTANTS

Figure 4:
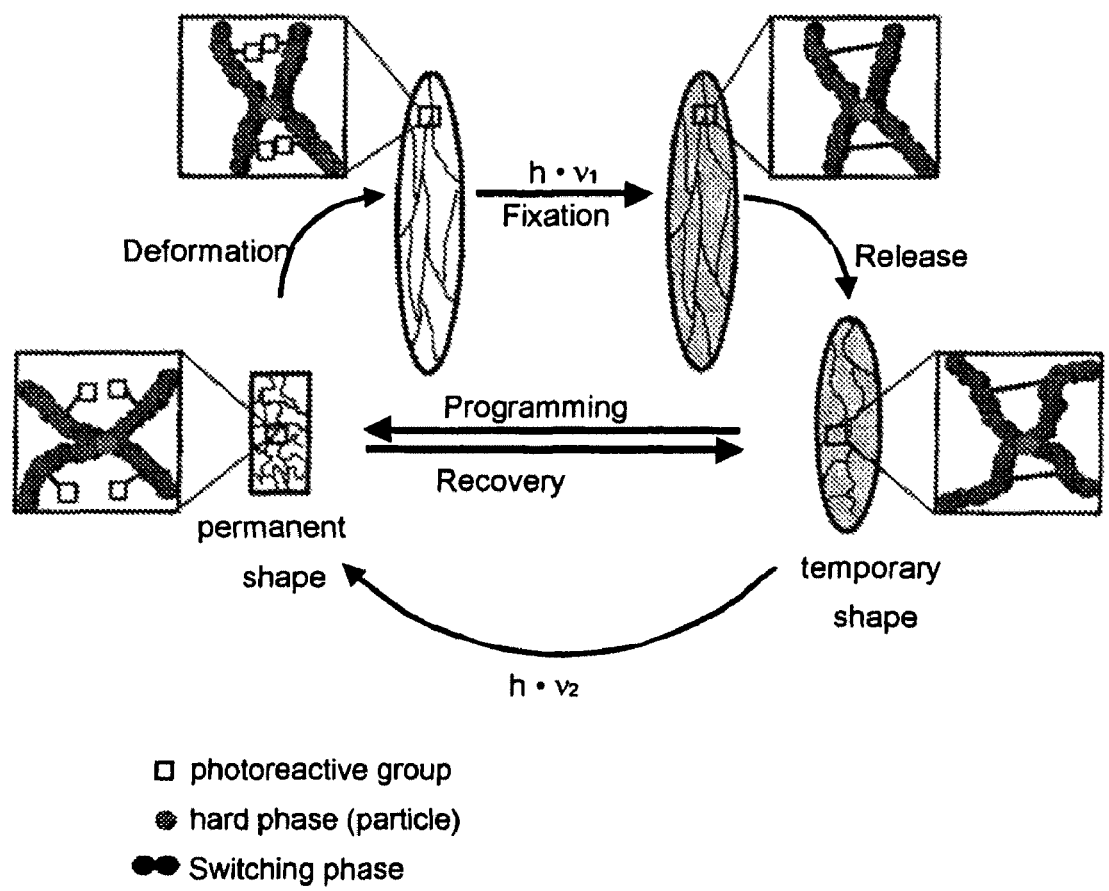
FIG. 4 shows the principle mechanism of the shape memory function of the composites of the present invention.

FIG. 4: PRINCIPLE MECHANISM OF THE SHAPE MEMORY FUNCTION OF THE COMPOSITES. PHOTOREACTIVE GROUP, HARD PHASE (PARTICLE) AND SWITCHING PHASE ARE SHOWN.

DETAILED DESCRIPTION OF THE PRESENT INVENTION

As defined in claim 1, the shape memory composites in accordance with the present invention show a structure corresponding to the structure of conventional shape memory polymers including hard segments/chemical network points and switching segments as disclosed in known systems. The composites in accordance with the present invention are characterized in that the switching phases of the composites include segments in accordance with the definition for switching segments for shape memory polymers in accordance with known systems, namely organic moieties, i.e. oligomeric or polymeric chains, whereas the hard phases/chemical network points of the shape memory composites in accordance with the present invention are selected from solids, including organic and inorganic solids, preferably inorganic solids, which may be present in the form of particles, including nano particles and micro particles, fibers, filaments, platelets, sheets, films etc. The term solids as employed herein in connection with the hard phases/chemical network points of the shape memory composites includes a particulate material with either a high melting point or which does not melt at all, high melting points being preferably in the range of 200° C. and above, more preferably 250° C. and above, and which preferably does not show any change in structure other than volume changes caused by thermal expansion, sintering or the like when heated up to 200° C. or higher, preferably up to 250° C. or higher.

Contrary to the conventional shape memory polymers the hard phases/chemical network points of the composites of the present invention are not build from individual segments enabling chemical or physical crosslinks but are made of solids, i.e. particulate material which possess strong coherent forces, so that the hard phases are not build from individual segments (molecular level) but are introduced into the composites as such, on a macroscopic level.

The switching phases in accordance with the shape memory composites in accordance with the present invention maybe bonded to the hard segments/chemical network points by physical interactions or by chemical bonds (covalent bonds). Physical interactions give rise to thermoplastic shape memory composites, whereas chemical interactions correspond to network-type shape memory composites.

With respect to the structure of the shape memory composites in accordance with the present invention, it can be stated that same corresponds closely to the structure of conventional shape memory polymers, including hard segments/chemical network points and switching segments, with the main difference being that the hard segments/chemical network points in accordance with the present invention are selected from solid matter, as identified above and as further explained below (in the following hard segments). The switching phases in accordance with the present invention allow the elastic, reversible deformation of the shape memory composites in accordance with the present invention, so that an initial, original, permanent shape defined by the hard segments may be recovered after an appropriate application of an external stimulus. The switching phases of the composites in accordance with the present invention allow, as outlined above an elastic deformation, and enable, at the same time a fixation of the deformed shape, in principle in accordance with the mechanism as disclosed in known systems for conventional shape memory polymers. The switching phases in accordance with the composites of the present invention may be switching segments susceptible towards a change in temperature or susceptible to other external stimuli, such as light, etc.

Suitable examples for hard phases and switching phases in accordance with the present invention are outlined and identified below.

Hard Phases

Suitable hard phases are selected from particulate mater, including particles, fibers, filaments, platelets, sheets and films, prepared from ceramic materials, metals, metal alloys, latex, inorganic materials, such as oxides, hydroxides (Fe(OH)$_3$), silica, mica, alumina, phosphates, such as calcium phosphates, carbon black, graphite, glass, polymeric materials, such as polystyrene, in particular in the form of beads, etc. Other suitable polymeric materials are the high melting point polyamides, such as the aramides, which again may preferably be employed in the form of beads. A further possibility is the use of magnetic particles, which furthermore also enable the heating of the composites, in order to initiate a temperature dependent shape transformation by using magnetic fields which heat up the magnetic particles contained in the shape memory composite so that as a consequence the overall composite is heated up. A suitable option are also hybrid particles and particles being composed of different inorganic or organic materials, respectively. Examples thereof are particles with a core-shell structure, including an organic or inorganic core and an inorganic or organic outer shell, for example inorganic cores (such as magnetic materials) coated with a polymeric, organic material, which may also provide the necessary functional groups.

In a preferred embodiment of the present invention the hard phases include at least approximately 50%, preferably to at least approximately 90%, of particles with a sphere equivalent diameter of at least 1 nm, in particular of at least 10 nm, and further preferred of at least 100 nm, wherein the sphere equivalent diameter is defined as the diameter of a sphere having the same volume as the particle and the percentage is related to the total number of particles in the hard phases. Suitable upper limits for the above outlined particle sizes for the hard phases are about 150 nm as well as about 200 nm, but the present invention also contemplates the use of particles as hard phases having larger particle sizes, such as up to several micrometers, such as up to approximately 5 or up to approximately 10, or even up to approximately 100 micrometer.

The present invention however, as already outlined above and further explained below also envisages the use of plate shaped or fiber shaped solid materials as hard phases.

Figure 1:
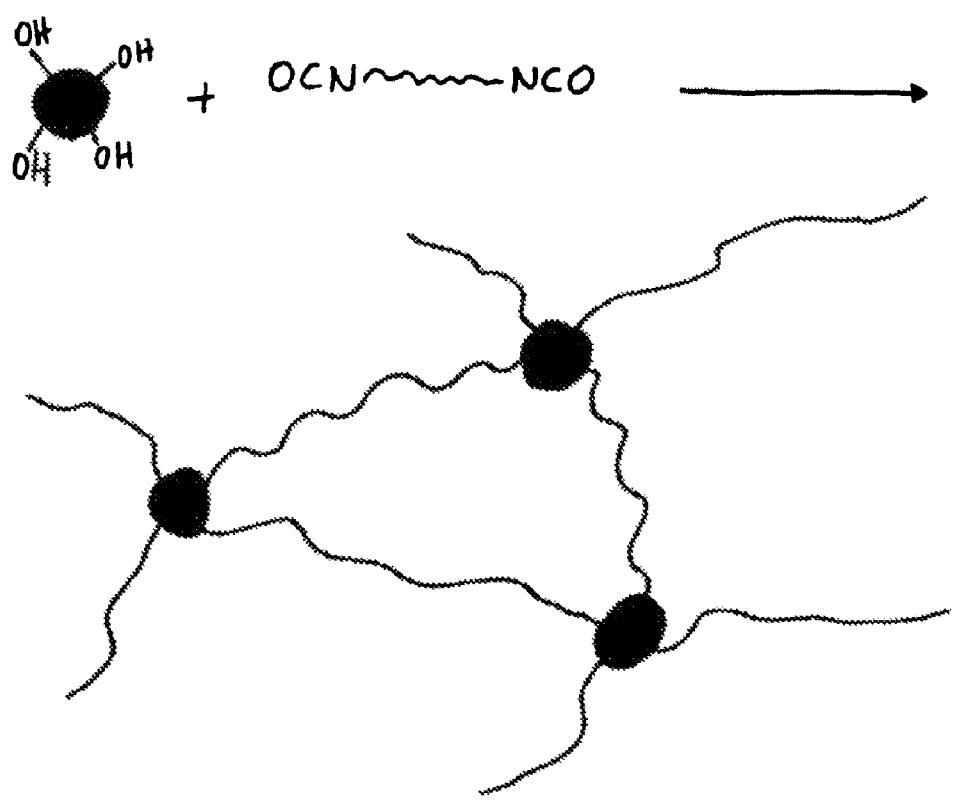
FIG. 1 shows a schematic representation of suitable building blocks (hard phases and building blocks for the switching (soft) phases) for the shape memory composites of the present invention.
Figure 2:
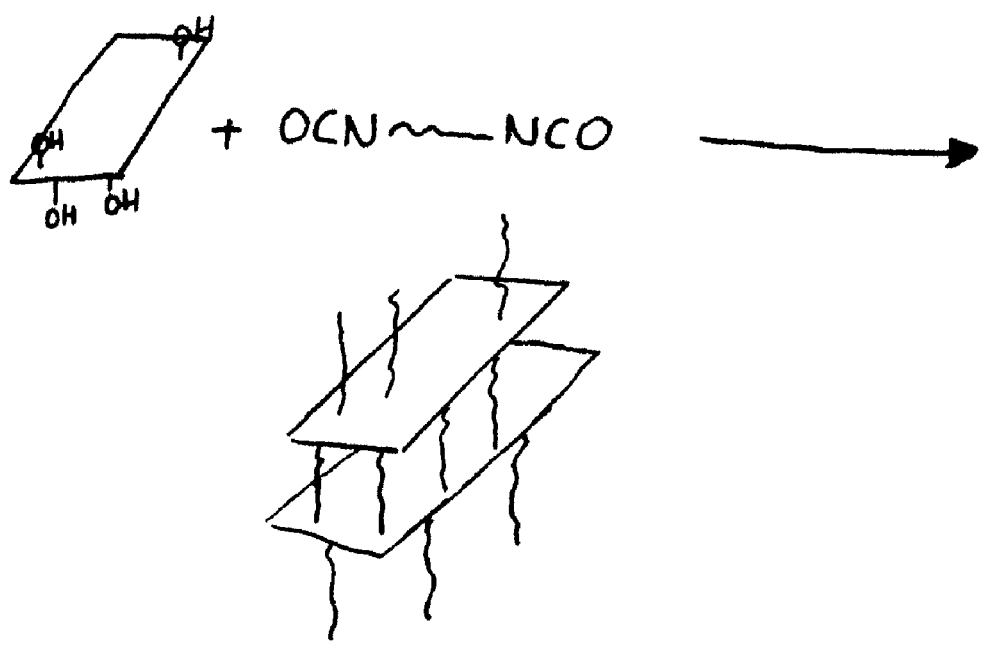
FIG. 2 shows a further alternative of building blocks of the shape memory composites of the present invention.
Figure 3:
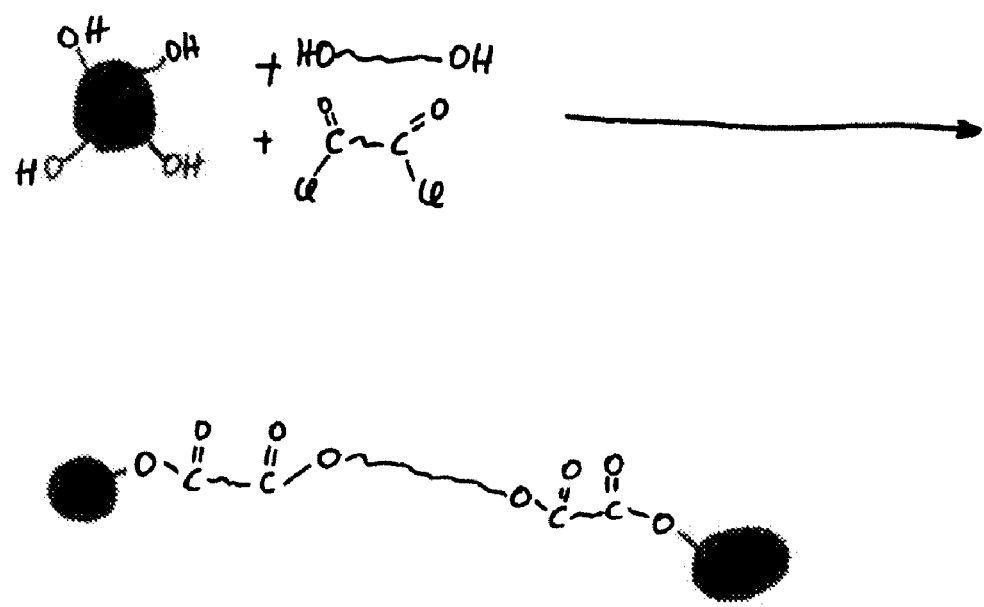
FIG. 3 shows a further possibility of linking building blocks for shape memory composites of the present invention using a further reactant.

The only requirement with respect to the hard segments is that a suitable functionalization on the surface thereof must be provided so that it is possible to link the switching phases to the hard phases. As outlined above, the linking of the hard phases and the switching phases may be provided by physical interaction or by chemical interaction (covalent bonds). Chemical interactions can, in particular, be provided when the hard segments show suitable functional groups on the surface, susceptible to chemical reactions with appropriately modified precursors for switching phases, either directly or by further reactants. Suitable functional groups for the hard phases are in particular hydroxyl groups, amine groups, thiol groups and carboxylic acid groups, as well as any suitable derivatives thereof, including ethers, esters, anhydrides, amides etc. A further alternative is the provision of reactive vinyl groups on the surface of hard phases, an option on particular suitable for hard phases made from organic, for example polymeric materials, such as styrenics, polyamides, acrylics etc., or inorganic particles coated with the aforementioned organic, polymeric materials. These types of reactive groups on the surface enable for example the linking of switching phases using precursors having appropriate reactive groups, such as unsaturated organic groups, for example methacrylate terminal groups. In accordance with the present invention the solids may include one type of functional groups on the surface thereof or a mixture of more than one type of functional groups. Such an embodiment may in particular be used for the preparation of composites employing different switching segments, for example when using precursors thereof possessing different, corresponding functional groups. Switching phases may be linked to hard phases including the above-outlined functional groups by suitable chemical reactions, for example, using precursors of switching phases having isocyanate terminal groups which may react with hydroxyl groups of the hard phases (FIGS. 1 and 2). Other suitable reactive groups for the precursors of switching phases are epoxy groups, thiol groups etc. It is also possible to link hydroxyl modified precursors of switching phases to hydroxyl group bearing hard phases by using appropriate reactants, such as organic compounds possessing two acid chloride groups (FIG. 3). Other possible and suitable combinations of reactive groups and reactants will be apparent to the skilled person on the basis of the above-provided explanation and under due consideration of basic chemical knowledge. In this connection, reference is furthermore made to the three above-identified international patent applications, which are incorporated herein by reference with respect to the assembly of hard and switching segments by means of chemical reactions, reactions which may be employed in analogous way in the present invention for linking hard and switching phases.

As outlined above, it is, however, also possible to link the switching phases by physical interactions to the hard phases. Suitable physical interactions are in particular ionic interactions as well as coordinative interactions and other types of interactions, for example, hydrogen bonding etc. The skilled person, based on the above-provided explanation of the structure of the shape memory composites in accordance with the present invention, will be in a position to appropriately select suitable pairs of hard and switching phases for such types of shape memory composites of the present invention.

Switching Phases

The switching phases in accordance with the present invention are selected among organic, oligomeric or polymeric chain-like moieties, which enable, after preparation of the shape memory composite, an elastic deformation of the composite from the permanent shape to the temporary shape and the recovery of the permanent shape after application of a suitable external stimulus. These switching phases may be provided using precursors which may be linear, cyclic, branched etc.

Suitable switching phases may be prepared using the switching segments as identified in the three above-mentioned international patent applications which are incorporated herein by reference. Precursors of such switching phases, which include at least two suitably reactive functional groups, are reacted with suitably functionalised hard phases so that either a physical or a chemical linkage is established between the hard phases and the switching phases. In embodiments the resulting composites show a structure corresponding to a matrix of the switching phases encapsulating the hard phases. The respective amounts of hard phases and switching phases in the composites of the present invention enable that the composites allow an elastic deformation, while the hard phases define the permanent shape. The amount of switching phases is adjusted so that after the elastic deformation enough switching phases are present so that the deformed (temporary) shape may be fixed by suitable interactions within the switching segments. On a molecular level this fixation may be explained as already defined for the conventional shape memory polymers mentioned above.

In accordance with the present invention, it is required that the switching phases are able to undergo at least one transition, which may be a thermal transition (crystalline/amorphous) or any other transition (for example, a photosensitive cleavage of bonds), including in particular a glass transition temperature, a melting temperature or a change in crystal form. As already known for conventional shape memory polymers, such transition temperatures or transition states enable the initial formation of a temporary shape, the fixation of the temporary shape and the subsequent recovery of the original, i.e. permanent, shape.

The composites in accordance with the present invention may include one type of switching segments so that one shape may be remembered (for example one switching segment providing one thermal transition) or more thereof, so that more than one shape may be remembered. As derivable from the known systems cited herein the number of shapes which may be held in memory corresponds to the number of different switching segments, i.e. transitions provided, by the switching segments. Two or more switching phases may be provided by using a mixture of different precursors or by using precursors which have a block copolymer structure, as derivable from the prior art cited herein and incorporated herein in this respect by reference. Thereby it is possible to provide composites with more than one temporary shape, so that multiple shape changes without reprogramming are possible, after a suitable programming sequence.

When the switching phases to be employed in accordance with the present invention only include only one type of repeating units, shape memory composites having one shape in memory can be prepared. Using switching phases having more than one transition state, for example, di-block or tri-block switching phases having chemically different blocks, enable the preparation of shape memory composites having two shapes in memory, as already explained with respect to conventional shape memory polymers. The different blocks of the block copolymer switching phases as exemplified above, for example, may provide different transition temperatures, for example, associated with two different glass transition points. These two transition temperatures then accordingly give rise to the programming of two distinct temporary shapes which are kept in memory, so that two shapes may be memorized. It is also possible to provide switching phases prepared from precursors of two or more immiscible or scarcely miscible polymeric phases, so that switching phases showing more then one transition temperature are obtained.

Other possibilities are photosensitive groups within the switching phases. According to this alternative the deformation into the temporary shape is fixed by irradiation so that a photoreaction is initiated, for example a cycloaddition, providing covalent bonds between different chains of polymeric segments within the switching phase. These bonds secure the deformed, i.e. temporary shape. Recovery of the permanent shape may be initiated by a further irradiation leading to a cleavage of the covalent bonds formed by the cycloaddition, so that the composite is transformed back to the permanent shape.

Based on the above discussion and taking the disclosure in the three above mentioned international patent applications, incorporated herein by reference, into account, the skilled person will be in the position to select suitable building blocks for switching phases in accordance with the present invention.

Structures

As outlined above, the shape memory composites in accordance with the present invention may be provided in the form of thermoplastic materials or network materials, depending on the type of hard phases and switching phases selected and the type of linkage between these phases. The present invention of course also contemplates interpenetrating networks as well as semi-interpenetrating networks, which may be prepared in accordance with the general knowledge of the skilled person, and as further exemplified in the three above-mentioned international patent applications.

Suitable methods for preparing the composites of the invention are conventional processes such as reactive extrusion, wherein the starting materials, i.e. solid material (hard phase) as well as switching segment precursors are first blended and then reacted under suitable conditions within an extruder. Other possibilities are blending in a mixer and subsequent reaction in a reactor, under stirring etc. as well as blending and reacting the starting materials in a kneader. It is of course also possible to blend these starting materials in any other desired manner.

In connection with the methods described above it furthermore has to be taken into account that network materials are obtained after completion of the chemical reaction in the permanent shape, so that any method of preparing such a composite has to take into account the desired permanent shape, i.e. the process has to be adapted accordingly.

As identified above the shape memory composites in accordance with the present invention may be provided in the form of a matrix phase of the switching phase, having dispersed therein particulate hard phases, in the form of particles, fibers platelets etc. (FIGS. 1 and 4). A further alternative is the provision of sandwich structures (FIG. 3) having film shaped or sheet like hard phases linked by interposed layers of switching phases.

The present invention enables accordingly the preparation of shape memory composites, which are suitable in a vast variety of fields of application, including in particular injection molding applications, extrusion applications, solution techniques as well as coating applications. The shape memory composites in accordance with the present invention may provide materials having improved mechanical properties, compared with conventional shape memory polymers and even conventional shape memory polymer compounded with fillers. In particular, the shape memory composites in accordance with the present invention provide improved strength and hardness, in particular due to the use of solids as hard segments. Furthermore the present invention provide composites showing shape memory functionality at comparably low costs, since in particular conventional starting materials are employed as hard phases. The use of magnetic particles as hard segments furthermore enable the preparation of composites which do show a shape memory effect in response to a magnetic field, for example using switching segments showing a sensitivity towards a temperature increase which can be realized by applying a magnetic field so that the magnetic particles heat up, providing the necessary heat for initiating the shape memory effect.

Shape memory composites in accordance with the present invention may by prepared using conventional chemical synthesis, for example mixing the suitably functionalised hard phases with precursors for the switching phases, in any desired ratio, and initiating the reaction between the functional groups of the hard phases with the corresponding functional groups of the precursors of the switching phases. Preferably such reactions are carried out in bulk, i.e. using a mixture comprising only the hard phases and the precursors of the switching phases optionally in the presence of additives, as long as these do not interfere with the synthesis of the composite. Suitable devices for preparing the composites in accordance with the present invention are kneaders, extruders and any type of reactors which enable the mixing of hard phases and precursors of the switching phases, preferred are in particular extruders since these devices allow the continuous preparation of shape memory composites of the present invention by reactive extrusion processes.

The invention claimed is:

1. A shape memory composite, comprising
   a magnetic particle with a core-shell structure of an inorganic core comprising a magnetic material and a shell of a polymeric organic material, and
   a switching phase derived from a material selected from the group consisting of an organic, an oligomeric and a polymeric material, which possess at least one transition state, and
   wherein the switching phase is linked by covalent bond with a polymeric organic material of the shell.

2. The shape memory composite of claim 1, wherein the at least one transition state of the switching phase is a thermal transition selected from the group consisting of a glass transition temperature and a melting temperature.

3. The shape memory composite of claim 1, wherein the at least one transition state of the switching phase is a photoreactive transition.

4. The shape memory composite of claim 1, wherein the composite comprises more than one switching phase.

5. The shape memory composite of claim 1, wherein the shell of a polymeric organic material has a surface, and on the surface is a reactive group selected from the group consisting of a hydroxyl group, thiol group, vinyl group, amine group and carboxylic acid group.

6. The shape memory composite of claim 1, wherein the shell of a polymeric organic material has a surface and on the surface is a hydroxyl group, and the switching segment is derived from a precursor selected from the group consisting of a oligomeric precursor and polymeric precursor having a terminal isocyanate group.

7. The shape memory composite of claim 3, wherein the photoreactive transition is a reversible photodimerisation.

8. The shape memory composite of claim 7, wherein the reversible photodimerisation is a photoinitiated cycloaddition.

9. A method of preparing the shape memory composite of claim 1, comprising
   1) forming an inorganic core comprising a magnetic material, coating the inorganic core with a polymeric organic material, and obtaining a magnetic particle with a core-shell structure;
   2) reacting the magnetic particle with a core-shell structure with a compound having at least two reactive groups selected from the group consisting of an organic compound, an oligomeric compound and a polymeric compound;
   3) forming covalent bonds between the magnetic particle with a core-shell structure and the organic compound; and
   4) linking the magnetic particle with a core-shell structure to the organic compound.

10. The method of claim 9, further comprising using an extruder in step 2) during the reacting the magnetic particle with a core-shell structure with a compound having at least two reactive groups.

* * * * *